United States Patent [19]

Burris

[11] 4,211,575

[45] Jul. 8, 1980

[54] ASPHALT-SULFUR EMULSION COMPOSITION

[76] Inventor: Michael V. Burris, 1760 Industrial Rd., Las Vegas, Nev. 89102

[21] Appl. No.: 1,536

[22] Filed: Jan. 8, 1979

Related U.S. Application Data

[63] Continuation-in-part of Ser. No. 726,946, Sep. 27, 1976, abandoned.

[51] Int. Cl.$^2$ .......................... C08L 95/00; C09D 3/24
[52] U.S. Cl. ............................. 106/274; 106/273 N; 106/277; 106/278; 106/279; 252/311.5; 404/17; 404/79
[58] Field of Search ............... 106/274, 277, 278, 279; 404/79; 252/311.5

[56] References Cited

U.S. PATENT DOCUMENTS

| | | | |
|---|---|---|---|
| 2,182,837 | 12/1939 | Bacon et al. | 404/79 |
| 2,602,029 | 7/1952 | Bradshaw | 106/247 |
| 3,126,350 | 3/1964 | Borgfeldt | 106/277 X |
| 3,270,631 | 9/1966 | Bower | 106/277 X |
| 3,476,679 | 11/1969 | Fauber | 106/278 X |
| 3,923,537 | 12/1975 | Wood | 106/277 |
| 3,970,468 | 7/1976 | Garrigues et al. | 106/277 X |
| 4,008,096 | 2/1977 | Knapp | 106/277 |
| 4,073,659 | 2/1978 | Burris | 106/278 X |
| 4,094,696 | 6/1978 | Burris | 106/277 |
| 4,154,619 | 5/1979 | Pronk | 106/274 |

*Primary Examiner*—Howard E. Schain
*Attorney, Agent, or Firm*—Seiler & Quirk

[57] ABSTRACT

In a stockpile asphalt emulsion composition an improved asphalt phase comprises 40–70% of paving grade asphalt, 10–50% sulfur, and 5–30% liquid hydrocarbon.

5 Claims, No Drawings

ASPHALT-SULFUR EMULSION COMPOSITION

REFERENCE TO OTHER APPLICATIONS

This application is a continuation-in-part of co-pending application Ser. No. 726,946, filed Sept. 27, 1976, now abandoned.

BACKGROUND OF THE INVENTION

In order to achieve a suitable stockpile mix composition, used for repairing asphaltic concrete surfaces, such as potholes, and the like, usually caused by weather and temperature variations, the material is desirably of a high stability, where it may be stockpiled for substantial periods of time, and still be workable, Thus, such a composition is to be soft enough, even during cold temperature conditions, to be removed from the stockpile and worked into the surface area to be repaired, without being heated in an apparatus. At the same time, the composition must have a stability to prevent it from becoming easily deformed or rutted by automobile traffic in warm weather. Thus, these two criteria are desirably achieved in improved stockpile compositions.

In my aforesaid co-pending application, there is disclosed an improved asphalt emulsion composition for the purpose of achieving a stockpile mix which may be stored for substantial periods of time, and still remain soft enough for use, even in cold weather conditions. However, the material did not have the desired stability or stiffness to prevent warm weather deformity under traffic conditions. It is to the preparation of a superior asphalt emulsion stockpile mix that the present invention is directed.

SUMMARY OF THE INVENTION

The asphalt emulsion of the present composition comprises the use of sulfur mixed in the asphalt phase together with a hydrocarbon softening agent to achieve an asphalt material which is emulsified to provide a superior stockpile mix product. The sulfur is mixed in critical proportions with a paving grade asphalt, and to which a liquid hydrocarbon, also in specific proportions is mixed. The materials are also mixed in a preferred high temperature process, above the melting point of sulfur, but below a critical temperature at which chemical reaction between the sulfur and asphalt will occur. Specific materials including emulsifiers, petroleum hydrocarbon softening agents, and the like will be described hereinafter as will the process for preparing the improved composition of the invention.

DETAILED DESCRIPTION OF THE INVENTION

In preparing the composition of the present invention, the asphalt phase is of significant importance. The asphalt phase is made up of asphalt, suflur and a liquid petroleum hydrocarbon softening agent. The ingredients are mixed in critical proportions, and preferably at elevated temperature conditions.

The asphalt used in the asphalt phase of the composition is a paving grade asphalt, also referred to in the art as an "aged residue" (AR) grade. The asphalt us used in amounts of between about 40 and about 70%, by weight, of the asphalt phase. The common available AR grades of paving asphalt are AR-1000, AR-2000, AR-4000, AR-8000, and AR-16000.The numerical designation is the median viscosity of the asphalt at 140° F. (60° C.) in poises after aging. These paving asphalts are sometimes also referred to as penetration grade asphalts, having original penetrations at 77° F. (25° C.) of between about 40 and about 300 dmm. The preferred asphalts used in the invention are the softer paving asphalts, sepecifically the AR-4000 and AR-2000 grade materials. The use of liquid asphalts are excluded from the present invention because of the substantial amounts of solvents used in their preparation.

Sulfur is used in its commerical or technical grade, usually in flour or particulate form. The sulfur is mixed with the asphalt to achieve a substantially homogeneous mixture, which is most difficult or impractical at ambient temperatures. The amount of sulfur to be mixed with the asphalt is between about 10 and about 50%, by weight, of the asphalt phase. Preferably, the amount of sulfur used is between about 20 and about 30%, to achieve the desired emulsion composition characteristics. Although greater amounts of sulfur may be used, it has been found that product characteristics are not significantly improved over the same formulations in which sulfur content is at about 30%. On the other hand, where sulfur amounts of less than about 20% are used, the desired balance of product performance characteristics may not be achieved.

The liquid petroleum hydrocarbon softening agent is one having a boiling point above about 350° F. Suitable materials include gas oil and fuel oil. Gas oil is a petroleum distillate having a viscosity and boiling range between kerosene and lubricating oil, normally between about 355° and 800° F. Such a gas oil also preferably has an API gravity of between about 10° and about 30°. Although kerosene could be used as the liquid hydrocarbon, because of its relatively low boiling point of about 325° F., resulting in early volatilization in the composition, and causing more rapid deterioration, it is not a preferred material. Fuel oils, specifically Nos. 2–6 fuel oils, having a boiling range of about 400° F. and above are preferred. Especially preferred are the viscous No. 5 and No. 6 fuel oils, sometimes referred to as bunker fuels. No. 5 bunker light has a viscosity of 26.4–65 cs (centistokes) at 100° F., and No. 5 heavy viscosity of 65–194cs. No. 6 bunker has a viscosity of 92–638cs at 122° F. In addition to these oils, useful hydrocarbons are the light oils such as fluxing oils, particularly highly aromatic, low viscosity, low volatility petroleum fractions such as obtained from thermally cracked residues, high boiling fractions of catalytically cracked gas oil, boiling fractions of crackling cycle stocks, residues from pyrollysis of residual petroleum fuel oils used in the production of gas and the like, and highly aromatic extracts of distillate oils used in making lube oils. Preferred members of the latter group include the high boiling extracts obtained by use of nonreactive highly polar, aromatically preferential solvents such as liquid sulfur sioxide, phenol, cresylic acid, beta-dichloroethyl ether, nitrobenzene, etc. The use of the so-called double solvent process employing mutually immiscible solvents like cresylic acid and propane also yields suitable extracts. The useful hydrocarbon fractions may contain paraffinic unsaturated and napthenic compounds, but are predominantly aromatic, that is, they contain above about 55% and preferably above 65% aromatics by weight. Viscosities of these materials may range from about 35-150 SSU at 210° F. to 75 to more than 13000 SSU at 100° F. In general, the most preferred petroleum hydrocarbon fractions have a viscosity-gravity constant (VGC) above 0.905 and initial boiling points above about 350° F. and preferably above 500° F. Mixtures of these hydrocarbons may also be used. More preferably, initial boiling points of the hydrocarbon compositions are above about 500° F. with flash points (c.o.c) above about 300° F. Typical of these hydrocarbons are "Dutrex" oils available from Shell Chemical Co.

The amount of liquid petroleum hydrocarbon used in the asphalt phase of the composition is between about 5 and about 30%, by weight. Preferred amounts are in the 5-15% range, again so as to achieve a stockpile composition having desired penetration and softening point characteristics. It has also been found, according to the invention, that the oil is preferably mixed with the material only after the asphalt and sulfur have been combined. For example, where the oil is mixed with the asphalt prior to or at the time of sulfur addition, the amount of sulfur which can be held in suspension in the asphalt phase is reduced, because of the reduced viscosity of the composition when the liquid hydrocarbon is added.

In preparing the asphalt phase, although sulfur may be mixed with asphalt at ambient temperatures, the preferred process is accomplished at elevated temperatures. Specifically, the asphalt and sulfur are independently heated above about 200° F. and up to about 300° F., the sulfur being heated to the molten state, and materials are then blended together. In the blending, the same elevated temperatures should be maintained so that the sulfur remains molten thereby substantially improving the mixing of the two ingredients. However, temperatures of about 305° F., and above, are to be avoided because sulfur begins to chemically react with the asphalt, causing dehydrogenation and producing hydrogen sulfide. It is only after the desired amount of sulfur has been melted and mixed with the asphalt, that the liquid petroleum hydrocarbon is introduced and blended. The temperature of the composition at this time may be maintained, so long as substantial volatilization of the hydrocarbon is avoided. However, temperatures above the melting point of sulfur, about 230-235° F., will further allow improved mixing of the ingredients.

Following preparation of the asphalt phase, the emulsion is prepared. In preparing the emulsion, a minor amount of water is used in which is incorporated a sufficient amount of emulsifier to achieve an emulsifier concentration of between about 0.2 and about 4% by weight of the total composition. The emulsifiers may be cationic or anionic, or mixtures thereof. The preferred cationic emulsifiers are those selected from the group consisting of lignin amines, quarternary ammonium halides, amine acetate salts and alkyl-substituted imidazolines. The lignin amines are amine-type products derived from lignin reacted with a primary or secondary amine and formaldehyde or other aldehydes and ketones such as acrylaldehyde, benzaldehyde, acetaldehyde, acetone, etc. The lignin is obtained from materials such as wood, straw, corn cobs and the like and is extracted by known methods such as pulping the wood, the sulfate method, soda method, acid hydrolysis and solvent extraction. The amines reacted with the lignin may be any suitable primary or secondary means, for example, dimethylamine, butylamine, isopropylamine, and the like. More specific reference preparation of these cationic amine emulsifiers are disclosed in the U.S. Pat. No. 2,863,780 and are well known to those skilled in the art. A commercially available product in this group is Indolin W-2.

Another preferred group of cationic emulsifiers are the alkyl-substituted imidazolines, wherein one of the alkyl groups has between 12 and 24 carbon atoms and the other substituted alkyl groups have between 1 and 4 carbon atoms. Examples of these emulsifying agents are:

1- (2-aminoethyl)-2(4-tetradecenyl)-4,5-di-n-butyl-2-imidazoline,
1-(2-aminoethyl)-2-n-octadecyl-4-ethyl-2-imidazoline,
1-(2-aminoethyl)-2-n-eicosyl-2-imidazoline,
1-(-2-aminoethyl)-2-(12-heptadecenyl)-2-imidazoline, and
1-(2-aminoethyl)-2-(5,7-heptadecadienyl)-2-imidazoline Commercial products of this type are Tyfo K, "Nalcamines" and "Nalquats" such as Nalcamine CAE, a mixture of 1-(2-aminoethyl)-2-n-aliphatic-2 imidazolines where the aliphatic groups are heptadecenyl and heptadecadienyl. Other cationic emulsifiers may be used such as salts of primary aliphatic amines sold as "Armeens".

Other cationic emulsifiers include the quaternary ammonium halides such as the chlorides salts having the general formula

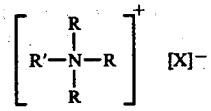

where R' group is a long alkyl chain, of between, for example, 12 and 24 carbon atoms and the remaining R groups are shorter alkyl or benzyl radical in order to impart oil solubility. The X moiety is a halide, preferably chloride or bromide, although other salts such as hydroxide, nitrate, sulfate, acetate and the like may be used. Examples of emulsifiers within this group are as follows:

Cetyltrimethylammonium bromide,
cetyldimethylethylammonium bromide,
n-dodecyltrimethylammonium chloride,
n-dodecyltrimethylammonium hydroxide,
n-tetradecyltrimethylammonium chloride,
n-octadecyltri-n-butylammonium nitrate,
n-hexadecyltrimethylammonium chloride,
n-tetracosyltrimethylammonium acetate,
n-docosylpropyldimethylammonium chloride,
n-tetradecyl-n-heptyldimethylammonium chloride,
n-heptadecyldipropylmethylammonium chloride,
n-hexadecylethyldimethylammonium chloride,
n-pentadecylbenzyldiethylammonium fluoride,
n-nonadecyldiethylmethylammonium sulphate,
p-diisobutylbenzyltrimethylammonium chloride.

Commercially available compositions of this type include, for example, Hyamine 2389 (methyldodecylbenzyltrimethylammonium chloride), Aliquat 26 (monotallowtrimethylammonium chloride) or Emcol-11, an N-alkylbenzyl N, N, N - trimethyl ammonium chloride with the alkyl group averaging 12 carbon atoms, "Arquad T" and "Arquad S", $C_{14}$–$C_{18}$ trimethyl ammonium chlorides with the alkyl groups of tallow and soybean oils, respectively.

The amine acetate salt emulsifying agents are the primary aliphatic amine acetate salts sold under the trademark "Armac". These amines are derived from primary, secondary or tertiary amines in which the aliphatic groups are alkyl groups ranging from about 8 to about 18 carbon atoms.

Suitable anionic emulsifiers include petroleum sulfonates, specifically alkaryl sulfonates such as alkali metal salts of methylnaphthalene sulfonate, p-dodecylbenzene sulfonate, mixtures of petroleum sulfonates, and the like, or sulfates such as n-hexadecyl sulfate, and the like. Suitable soap-type emulsifying agents include alkali metal sales of higher fatty acids, especially those having at least 8 carbon atoms in the molecule such as lauric, myristic, palmitic, oleic, ricinoleic, linoleic acids and the like, and mixtures of acids available from animal or vegtable oils, well known to those skilled in the art.

After the aqueous emulsifier phase is produced by combining the proper amount of emulsifier and water, the proportions of the emulsifier and asphalt phases are thoroughly mixed after which the composition is then blended with suitable aggregate in the desired proportions. The asphalt phase is used in a major amount, over about 50% be weight, of the total composition. Normally, this is accomplished in a pug mill with simply adding sand and/or sized aggregate as desired.

In order to achieve the stockpile mix composition having preferred characteristics, it is important that the asphalt phase have the properties of substantial penetration but a relatively high softening point. Specifically, a preferred asphalt phase has a penetration of at least about 300 dmm at 77° F. Such penetrations are measured based on well known tests according to ASTM D-5 or AASHO T-49, well known to those skilled in the art. The asphalt phase should also have a high stability, so that it is not so soft as to be susceptible to rutting when exposed to traffic at relatively warm temperatures. Thus, such a stability is indicated by the softening point of the asphalt phase, ideally being close to the original paving grade asphalt softening point.

The following compositions were prepared to illustrate applications within the scope of the invention. The asphalt phase was produced by heating sulfur and asphalt independently to temperatures above the sulfur melting point but below 300° F., after which the two ingredients were blended thoroughly to achieve substantial homogenity. Thereafter the liquid petroleum hydrocarbon was added to the hot composition and mixed. The percentage of ingredients as well as penetrations and softening points (ASTM D-36) are set forth in the table hereinbelow. The percentages are given by weight.

| | Asphalt | % | Hydrocarbon | Sulfur % | Penetration (%) | Soft. Point (°F) |
|---|---|---|---|---|---|---|
| 1) | AR-2000 | 45 | #6 bunker fuel oil | 5 | 50 300+ | 87.5 |
| 2) | AR-2000 | 55 | #6 bunker fuel oil | 5 | 40 300+ | 93.0 |
| 3) | AR-2000 | 65 | #6 bunker fuel oil | 5 | 30 300+ | 91.0 |
| 4) | AR-2000 | 60 | — | — | 40 159 | 96.5 |
| 5) | AR-2000 | 70 | — | — | 30 154 | 96.5 |
| 6) | AR-2000 | 80 | — | — | 20 174 | 90.0 |
| 7) | AR-2000 | 90 | — | — | 10 124 | 96.0 |
| 8) | AR-2000 | 100 | — | — | — 79 | 101.5 |
| 9) | AR-2000 | 90 | #6 fuel oil | 10 | — 182 | 98.0 |
| 10) | AR-2000 | 65 | gas oil | 5 | 30 500+ | 91.5 |

It will be seen from the above examples that those asphalt phase compositions within the present invention have a suitably high penetration, whereas those having ratios of sulfur and liquid hydrocarbon outside the limits of the invention have penetrations which are quite low. Further, where sulfur is increased above 30%, as shown in compositions (1) and (2), product characteristics are not appreciably improved. Emulsion compositions utilizing the asphalt phases within the scope of the invention are prepared as described hereinabove to produce the stockpile mix of the invention.

I claim:

1. An asphalt-emulsion composition comprising:
   an asphalt phase consisting essentially of between about 40 and about 70% paving grade asphalt, between about 10 and about 50% sulfur, and between about 5 and about 30% of a liquid petroleum hydrocarbon having a boiling point above about 350° F., and
   a water phase having between about 0.2 and about 4.0 % by weight based on the total composition of an emulsion selected from the group consisting of a cationic and anionic emulsifiers and mixtures thereof, and
   whereinsaid asphalt phase is over 50%, by weight, of the total composition.

2. The composition of claim 1 wherein said liquid petroleum hydrocarbon is selected from the group consisting of gas oil, fuel oil, and fluxing oil.

3. The composition of claim 2 wherein said fluxing oil comprises an aromatic hydrocarbon having at least 55% aromatics, by weight.

4. In a process for preparing an asphalt emulsion composition, an improvement for preparing an asphalt phase comprising
   heating a paving grade asphalt to a temperature between about 200° and about 300° F.,
   separately heating sulfur to above its melting point and below about 300° F.,
   mixing the heated asphalt and molten sulfur at a temperature above the sulfur melting point and below about 300° F., and blending a liquid petroleum hydrocarbon with the asphalt and sulfur mixture.

5. The process of claim 4 wherein the amount of asphalt is between about 40 and about 70%, sulfur is between about 10 and about 50%, and hydrocarbon is between about 5 and about 35%, by weight.

* * * * *